Figure 1:
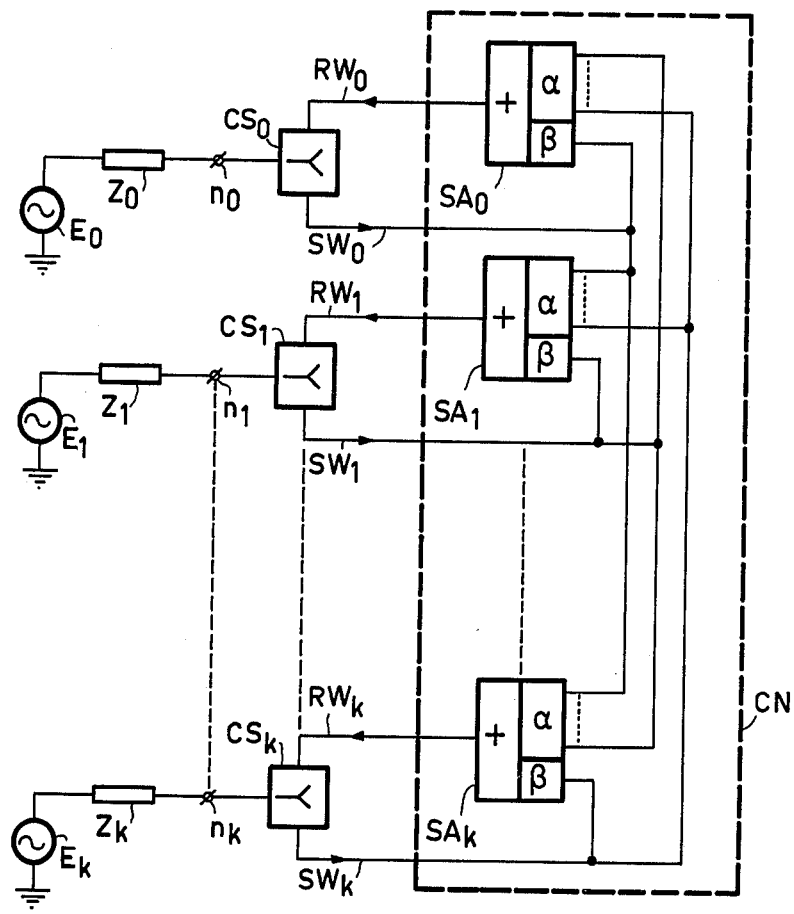

United States Patent [19]

van Mil et al.

[11] 4,425,478

[45] Jan. 10, 1984

[54] CONFERENCE SYSTEM FOR TELEPHONY

[75] Inventors: Job F. P. van Mil; Adrianus W. M. van den Enden, both of Eindhoven; Teunis A. van Harreveld, Hilversum, all of Netherlands

[73] Assignee: U.S. Philips Corporation, New York, N.Y.

[21] Appl. No.: 323,622

[22] Filed: Nov. 20, 1981

[30] Foreign Application Priority Data

Dec. 1, 1980 [NL] Netherlands .................. 8006519

[51] Int. Cl.³ .......................................... H04M 3/56
[52] U.S. Cl. .............................................. 179/18 BC
[58] Field of Search .................... 179/1 CN, 18 BC

[56] References Cited

U.S. PATENT DOCUMENTS

| 4,139,731 | 2/1979 | Hashemi | 179/1 CN |
| 4,268,716 | 5/1981 | Groves | 179/1 CN |
| 4,289,932 | 9/1981 | Reed | 179/1 CN |
| 4,360,910 | 11/1982 | Segal | 179/1 CN |

Primary Examiner—G. Z. Rubinson
Assistant Examiner—L. C. Schroeder

Attorney, Agent, or Firm—Thomas A. Briody; William J. Streeter

[57] ABSTRACT

A conference system for establishing simultaneous interchange of information among a plurality of participants ($E_o$–$E_k$) comprises a conference network (CN). Each participant is connected to a terminal ($n_o$–$n_k$) which is connected to a hybrid network ($CS_o$–$CS_k$). The output ($SW_o$–$SW_k$) from the hybrid networks ($CS_o$–$CS_k$) are fed to summing amplifiers ($SA_o$–$SA_k$) in the conference network CN. The outputs of the summing amplifiers are fed to the participants via the hybrid networks ($CS_o$–$CS_k$).

The summing amplifiers ($SA_o$–$SA_k$) are arranged so that the signals contributed by the participant to which the particular summing amplifier output is connected is multiplied by a factor $\beta$ while the signals contributed by the other participants are multiplied by a factor $\alpha$.

By returning a portion of the signal generated by a participant to that participant it is possible to construct a system having a lower attenuation while maintaining stability.

2 Claims, 2 Drawing Figures

CONFERENCE SYSTEM FOR TELEPHONY

The invention relates to a conference system for establishing simultaneous interchange of information among a plurality of participants, comprising a conference circuit for information signals of the conference, a connecting circuit for connecting each participant in the exchange of information to the conference circuit, each connecting circuit having an output circuit for transmitting the information from a participant to the conference circuit and an input circuit for receiving the information from the conference circuit for that participant and the conference circuit being arranged for receiving input information signals from the output circuit of each of the connecting circuits and for applying output information signals to the input circuit of each of the connecting circuits, said output information signal comprising a predetermined proportion of the algebraic sum of the input information signals from each of the further connecting circuits.

A conference system of this type is disclosed in the article "Conferencing fundamentals for digital PABX equipments" by R. J. d'Ortenzio, published in the Proceeding 1977, International Conference on Communications, pages 2.5-29 to 2.5-36.

Virtually all electronic exchanges, both of the time-division multiplex type (TDM) and those of the space-division multiplex (SDM) type are of the four-wire type. Connecting circuits (usually hybrid port-circuits or hybrid networks) at the input and output of the exchange provide for the two-wire/four-wire conversions and vice versa. In the known system the participants are connected to the two-wire side of the hybrid. The four-wire input signal for each hybrid is the algebraic sum of the four-wire output signals of all the further participants. Measures are taken to ensure that each participant's own signal is not returned to the participant's own input. This can, for example, be effected by summing all four-wire output signals whereafter the participant's own four-wire output signal is removed from the sum signal. This is done to increase the circuit stability (see page 2.5-31 lines 8-12 of the article by R. J. d'Ortenzio). For, the source impedance Z which may be associated with the circuit by means of which each participant is connected to the two-wire side of the hybrid is generally different for each participant. (These differences in source impedance are inter alia caused by the apparatus, the cable diameter, cable length and cable type). As a result thereof the hybrids will not be in balance and consequently—due to hybrid circuit overflow—spontaneously generated signals may be produced. It has been demonstrated that if this conference circuit is to be absolutely stable (absolutely stable means stable at any complex, passive source impedance) an additional attenuation must be introduced. The attenuation depends on the maximum number of participants (k+1) which can be connected to the conference system and this attenuation amounts to 20 log(k).

It is an object of the invention to provide a conference system of the type defined in the foregoing, which, while maintaining absolute stability, has a lower attenuation. According to the invention, the invention provides a conference system as described in the opening paragraph characterized in that the output information signals which are applied to the input circuit of each of the connecting circuits further comprise a predetermined proportion of the input information signal coming from the output circuit of that connecting circuit.

It has been found that the conference system in accordance with the invention for three participants gives an attenuation of not more than 3,5 dB (the prior art system gives 6 dB) and a conference system for 8 participants gives an attenuation of 12.0 dB (the prior art system 16.9 dB).

It should be noted that from the U.S. Pat. No. 4,119,807 it is known per se to return to the participants of the conference an attenuated version of their own contribution. However, this U.S. patent describes a conference system comprising a digital, PCM-TDM switching system which does i.a. not incorporate two-wire/four-wire conversions and connecting circuits, the above-mentioned constructional problems introduced thereby not being discussed.

Figure 2:
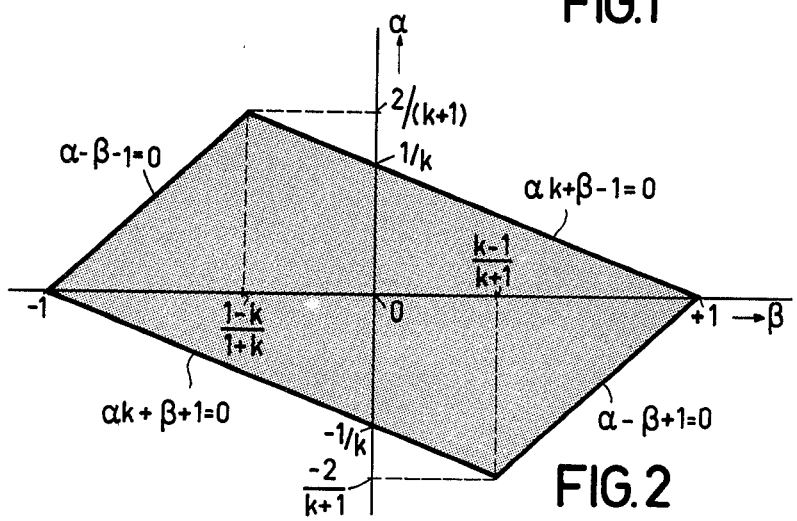

An embodiment of the invention will now be described by way of example with reference to the accompanying drawing, in which:

FIG. 1 shows a block schematic circuit diagram of a four-wire conference system according to the invention; and FIG. 2 shows the region in the $(\alpha,\beta)$-plane in which the conference system in accordance with the invention is absolutely stable.

FIG. 1 shows a four-wire conference network CN which forms part of a conference system for establishing simultaneous exchange of information between a number of participants (k+1) who can be connected to the terminals $n_0, n_1 \ldots n_k$. The participants are connected in a two-wire full-duplex mode to these terminals $n_0, n_1, \ldots n_k$. The signal contribution of a participant is shown in FIG. 1 as a voltage source $E_i$ in series with a source impedance $Z_i$, where $i=0, 1, \ldots k$. Due to differences in inter alia cable length, cable diameter, cable type and subscriber's set the source impedance $Z_i$ generally differs for each participant's equipment. In addition, the conference system comprises a connecting circuit $CS_i$, where $i=0, 1, \ldots k$ for connecting the participant connected to the terminal $n_i$ to the conference network CN. The connecting circuit comprises an output circuit (not shown) for transmitting the information from a participant to the conference circuit CN via conductor (pair) $SW_i$ and an input circuit (not shown) for receiving the information from the conference circuit CN via conductor (pair) $RW_i$. In practice, the connecting circuit is usually in the form of a hybrid port circuit or hybrid network, by means of which the two-wire full-duplex participant connection is converted into a four-wire connection for the separate transmission and reception of the information signal to and from the other participants. Hybrid port circuits of this type, which are know per se, comprise a balance impedance R which is matched to the best possible extent to the nominal value of the source impedance Z of the participants which are connected to the two-wire side. It is a property of a hybrid port circuit that if Z=R a maximum separation between the transmit and receive signals at the four-wire side is accomplished. In the ideal case the possible loop formed by the hybrid port circuit, the transmit conductor $SW_o$, the conference network CN and the receive conductor $RW_o$ is interrupted, the occurrence of regenerative phenomena being thus prevented from occurring. As mentioned in the foregoing, a perfect balancing is impossible in practice, owing to differences in the electrical parameters of the participant's equipment.

The conference network CN comprises a number of summing amplifiers $SA_i$, where $i=0, 2, \ldots k$. Each summing amplifier has $(k+1)$ inputs and one output. Of the $(k+1)$ inputs of, for example, summing amplifier $SA_P (p=0, 1, \ldots k)$, k inputs are connected to the connecting circuits $CS_i (i=0, 1, 2, k, i \neq p)$ via the transmit conductors $SW_i (i=0, 1, 2, k, i \neq p)$ for amplifying the information input signals by a factor $\alpha$. One input of the summing amplifier $SA_p$ $(p=0, 1, \ldots k)$ is connected via conductor $SW_p$ to the connecting circuit $CS_p$ $(p=0, 1, 2, \ldots k)$ for amplifying the information input signal by a factor $\beta$, $\beta \neq 0$. The sum of these two amplified signals is available at the output of each summing amplifier $SA_i$ and is applied to the connecting circuit $CS_i$ via receive conductor $RW_i$. As a result thereof each connecting circuit $CS_i$ receives via conductor $RW_i$ the information signals, amplified by the factor $\alpha$, of all the other participants of the conference and its own information input signal, amplified by the factor $\beta$. It has been found that an absolutely stable conference system is obtained if a value is chosen for $\alpha$ and $\beta$ which is situated in the hatched region of FIG. 2, when the source impedances $Z_i$ where $i=0, 1, \ldots k$, have a random value, are complex and passive. In FIG. 2 $\alpha$ is shown as a function of $\beta$ in a coordinate system with origin O. The attenuation of the conference system for $Z_i = Z$, where $i=0, 1, \ldots k$ appears to be minimal for $\alpha = 2/(k+1)$ and $\beta = (1-k)/(1+k)$ or for $\alpha = -2/(k+1)$ and $\beta = (k-1)/(k+1)$ and this attenuation amounts to 20 $\log_{10}(k+1)/2)$. For the case described in the article by R. J. d'Ortenzio, Conference fundamentals for digital PABX equipments, proceedings 1977, International Conference on Communications, section 2-5; pages 29-36, where the information input signal of connecting circuit $CS_i$ is not returned via summing amplifier $SA_i$, i.e. $\beta = 0$, this attenuation, as shown in FIG. 2, amounts to 20 $\log_{10} k$. Table I illustrates the attenuation of the conference system in accordance with the invention $(\beta \neq 0)$ and the prior art conference system $(\beta = 0)$ for a number of values of the number of participants $(k+1)$.

TABLE I

| k | Attenuation (dB) | |
|---|---|---|
| | $\beta \neq 0$ | $\beta = 0$ |
| 1 | 0 | 0 |
| 2 | 3.5 | 6 |
| 7 | 12.0 | 16.9 |
| 15 | 18.1 | 23.5 |

The Table shows that the attenuation of the conference system where $\beta \neq 0$ is significantly lower than the attenuation for the prior art system where $\beta = 0$, while the requirement of absolute stability is satisfied to the same extent. For very high values of k the difference in attenuation increases to 6 dB as is apparent from the above presented formulae.

The hatched region of FIG. 2 may alternatively be represented as the region located within the following four straight lines:

$\alpha k + \beta - 1 = 0;$ $\alpha k + \beta + 1 = 0;$ $\alpha - \beta + 1 = 0;$ $\alpha - \beta - 1 = 0.$ If extremely high and extremely low source impedances Z do not occur, the absolute stability requirement may be less severe and stability in the impedance range to be expected is sufficient. In that event the attenuation of the conference system (both the system in accordance with the invention and the prior art system) may be lower than the above-mentioned values at absolute stability. However, the difference in attenuation between the two systems is maintained. A lower attenuation implies that $\alpha$ and $\beta$ have a value which is located outside the hatched region in FIG. 2.

In the embodiment shown in FIG. 1 the output information signals of each connecting circuit $CS_1$ is applied to the summing amplifiers $SA_p$ $(p=0, 1, \ldots k, p \neq i)$ of the further participants where the contribution of the own participant, amplified by a factor $\beta$ is added. However, it is alternatively possible to sum the output information signals coming from all the connecting circuits and to add to that sum signal for each summing amplifier the contribution of the individual participant to the previously mentioned sum signal multiplied by a factor $(-\alpha + \beta)$.

It will be obvious that the function of the conference network CN which is implemented in hardware in the embodiment shown in FIG. 1 may alternatively be implemented in soft-ware.

In practice, the hybrid port circuits are not ideal. The hybrid port circuit will cause a certain attenuation during the transmission of the signal from terminal $n_i$ to conductive $SW_i$. This is, however, not an insurmountable problem, since provided the other hybrid port circuits have the same atenuation, the gain factor(s) $\alpha, \beta$ of the summing amplifiers $SA_i$ can be adapted to this situation. For an attenuation of $\frac{1}{2}$ by all hybrid port circuits, all gain factors might be chosen equal to $2\alpha$ and $2\beta$, respectively. It is alternatively possible for the participants in the conference to have an unequal power level, for example because of the fact that some participants are connected to the same local exchange and one or more further participants to the conference circuit via one (or even several) higher order exhcnage(s). In that case the gain factor of some participants must be adapted, which will result in that not all the signals applied to a summing amplifier $SA_i$ are amplified by $\alpha(\beta)$, but that the signal coming from predetermined participants is amplified to a greater or lesser extent than by $\alpha(\beta)$.

What is claimed is:

1. A conference system for establishing simultaneous interchange of information among a plurality of participants, comprising a conference circuit for information signals of the conference, a connecting circuit for connecting each participant to the conference circuit, each connecting circuit having an output circuit for transmitting information from a participant to the conference circuit and an input circuit for receiving information from the conference circuit for that participant, the conference circuit being arranged for receiving information signals from the output circuit of each of the connecting circuits and for applying information signals to the input circuit of each of the connecting circuits, each of the information signals applied to the input circuit of each connecting circuit comprising a predetermined proportion $\alpha$ of the algebraic sum of the information signals received from the output circuit of each of the further connecting circuits, and a predetermined proportion $\beta$ of the information signals from the output circuit of that connecting circuit.

2. A conference system as claimed in claim 1 wherein the conference system is absolutely stable in a region located around the origin of a $(\alpha,\beta)$ coordinate system (as shown in FIG. 2) and wherein the values $\alpha$ and $\beta$ are contained in the area bounded by the straight lines $\alpha k+\beta-1=0$, $\alpha k+\beta+1=0$, $\alpha-\beta+1=0$ and $\alpha-\beta-1=0$, $(k+1)$ being the maximum number of participants which can be connected to the conference system.

* * * * *